United States Patent

Williams

[15] 3,675,344

[45] July 11, 1972

[54] CONTROLLED DEGRADATION OF A VISUAL SCENE

[72] Inventor: David Christopher Robert Williams, New Barnet, England

[73] Assignee: Thorn Electrical Components Limited, London, England

[22] Filed: Sept. 11, 1969

[21] Appl. No.: 857,153

[30] Foreign Application Priority Data

Sept. 11, 1968 Great Britain ..................... 43,281/68

[52] U.S. Cl. ............................. 35/12 N, 350/174, 350/171
[51] Int. Cl. ....................................... B64g 7/00, G65h 9/08
[58] Field of Search .............. 35/12; 350/171, 174; 40/130 A

[56] References Cited

UNITED STATES PATENTS

| 2,482,115 | 9/1949 | Laird, Jr. | 35/12 N X |
| 2,838,864 | 6/1958 | Guida | 40/130 A |
| 3,114,979 | 12/1963 | Fox | 35/12 N |
| 3,218,926 | 11/1965 | Boone | 40/130 A |
| 3,315,391 | 4/1967 | Lane et al. | 40/130 A |
| 3,427,730 | 2/1969 | Noxon | 35/12 N |
| 3,436,840 | 4/1969 | Noxon | 35/12 N |

Primary Examiner—Robert W. Michell
Assistant Examiner—L. R. Oremland
Attorney—Kemon, Palmer & Estabrook

[57] ABSTRACT

Apparatus for controllably degrading a visual scene suitable for use as a fog simulator in an aircraft comprises at least one transparent sheet positioned between a light receptor such as a pilot's eye and a scene and angled with respect to light from the scene so that light from a diffuse source is reflected by the sheet or sheets towards the receptor. A stack of spaced, parallel transparent sheets may be used. The brightness of the diffuse source may be varied to compensate for variations in ambient light, or the height or attitude of the aircraft.

12 Claims, 2 Drawing Figures

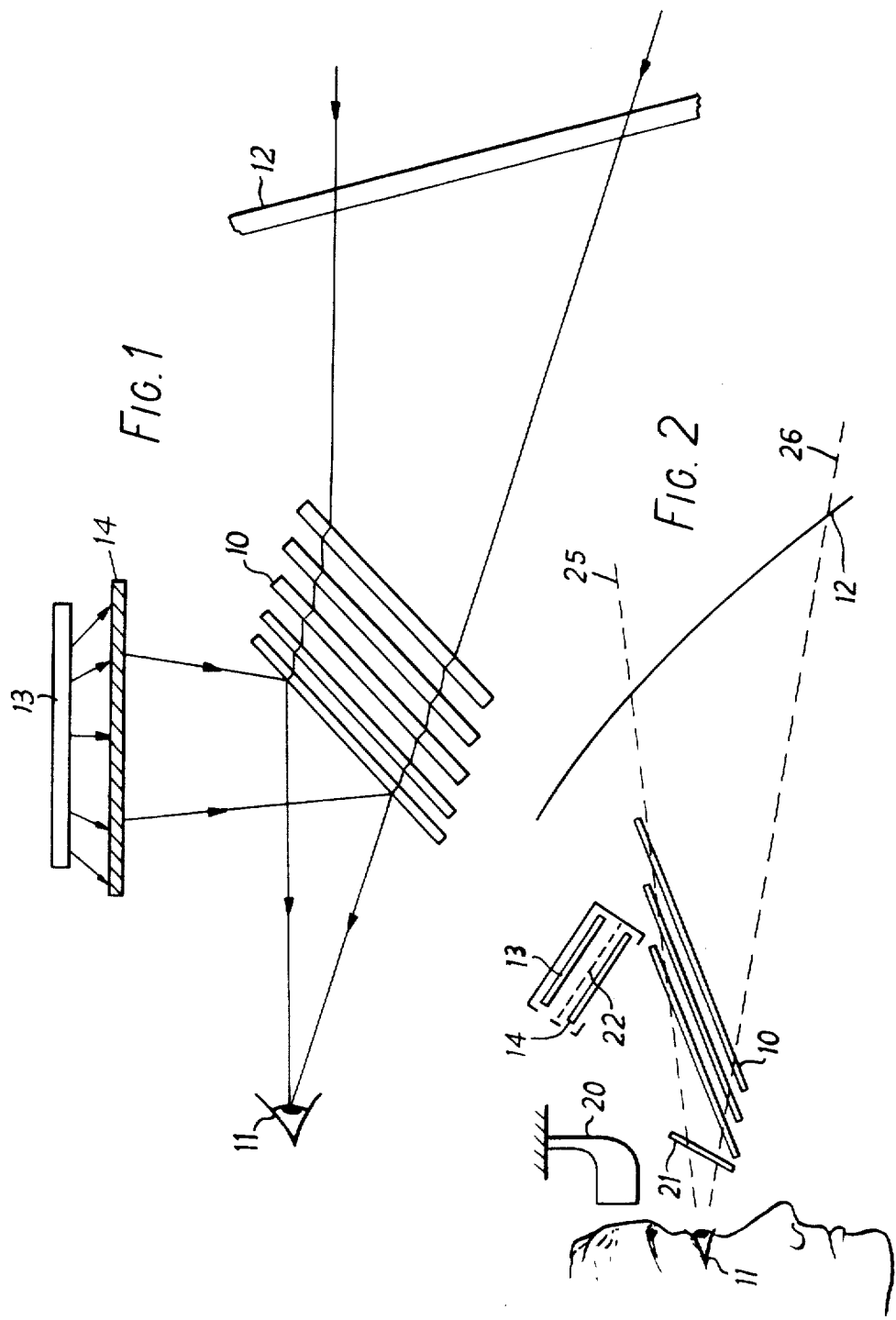

CONTROLLED DEGRADATION OF A VISUAL SCENE

This invention relates primarily to the simulation of fog for the training of aircraft pilots, but also relates generally to the controlled degradation of a visual scene as viewed by the eye, a television or photographic camera or the like.

In the training of aircraft pilots and testing of navigational systems, it is desirable to be able to simulate a natural fog. However it is frequently desirable for a co-pilot to have a clear view so as to be able to take over control of the aircraft in case of difficulties.

The effect of fog on a visual scene is twofold; firstly, the direct light coming from "target areas" is attenuated by scattering by the fog. This effect increases as the distance through the fog at which the visual targets are seen is increased. Secondly, by virtue of the scattering by fog of light in the general ambient illumination along the line of sight, there is an overlay luminance which appears to come from the direction of the target. These effects both increase when the separation between the observer and the visual target increases. The effect is to degrade the visual contrast of the scene viewed by the observer. The eye is able to detect only a certain minimum contrast, beyond which the targets are invisible.

An object of this invention is to provide apparatus capable of accurately controllably degrading a visual scene.

Another object of the invention is to provide a fog simulator capable of accurately simulating fog for use in an aircraft or flight simulator.

A further object of the invention is to provide an aircraft or flight simulator having a fog simulator capable of compensating for variations in ambient light conditions, or the height or attitude of the aircraft.

The invention consists of one or more transparent sheets through which a scene is viewed at an angle to the sheet or sheets whereby light from a diffuse source is reflected from at least one sheet and is superimposed on the light from the scene. The source may be the sky or may be a specially-provided diffuse source consisting of a lamp and a diffusing screen, in which case the lamp may be variable in brightness.

An embodiment of the invention is used as a fog simulator in an aircraft in which case the sheet or sheets are angled so that the pilot views increasing distances at an increasing angle to the perpendicular to the sheet. The sheet or sheets degrade the contrast seen by the pilot as a function of the angle of elevation, and thus when the aircraft is coming in to land the runway and lighting are degraded in substantially the same way as in a natural fog.

The invention will now be described in more detail, by way of example, with reference to the accompanying drawing, in which:

FIG. 1 schematically shows a fog simulator embodying the invention; and

FIG. 2 shows a modification of the fog simulator of FIG. 1.

As shown in FIG. 1, a stack of five glass plates or sheets 10 is positioned between the eye 11 of a pilot undergoing training and the windscreen 12 of an aircraft. The plates 10 are arranged at an angle to the means line of sight between the pilot and the windscreen. A light source 13 illuminates a ground glass diffuser plate 14 and light from the diffuser plate is reflected by the plates 10 generally towards the pilot's eye 11.

The plates 10 are tilted away from the pilot, so that when the pilot is looking through the uppermost part of the plates, rays from the observed scene strike the plates at an angle of about 80° to the normal. When the pilot looks through the lowermost part of the plate the rays from that part of the scene being observed strike the plates 10 at an angle of about 60° to the normal.

The principle of operation of the fog simulator thus constituted is as follows:

In a dielectric sheet such as glass or clear plastic, light will be transmitted and reflected at its surface. Usually with glass or clear plastic the proportion of light transmitted is greater than that reflected. As the angle between the light beam and the plane of the dielectric sheet decreases, tending towards grazing incidence, the proportion reflected increases at the expense of the transmitted light. If several layers of dielectric are superimposed the effect is enhanced.

The visual scene as seen by the pilot looking through the stack of plates 10 is a modification of the real scene. When he looks down a large proportion of the light entering his eye has come from the real scene and a relatively small proportion has come from the source 13 placed above the stack and seen by reflection. The contrast is therefore only slightly degraded. When the pilot looks at a higher angle the direct light is attenuated to a greater extent and the contribution to the visual scene made by the reflected light is larger, and the degration of contrast of the real scene is high.

Thus object seen through the plates at a higher angle of elevation appear more degraded in contrast than objects seen at a lower angle of elevation. When the range of angles of elevation corresponds to the range of targets as is the case with runway detail and landing lights as seen by the pilot on his approach path to landing there is simulated very closely the natural laws governing the degradation by fog of the contrast of targets with range.

The fog simulator shown in FIG. 2 is based on the simulator of FIG. 1. A pilot is so positioned that his eye 11 receives light from the windscreen 12 after it has passed through the stack of plates 10. The pilot's field of view is limited by the boundaries 25 and 26, and the plate stack is of sufficient extent to include these boundaries over an adequate head movement to prevent undue restraint of the pilot's head. A headrest 20 helps to localize the pilot's head.

The auxiliary light source comprising lamps 13 and diffuser plate 14 also includes a filter 22 which is chosen to achieve the optimum color balance of the plate 14, throughout the range of luminance of the lamps 13, to match the color of natural fog. The amount of overlay luminance can be varied by altering the power of the source 13. The effect of increasing the overlay luminance will be to simulate a denser fog, and the cut-off point, namely the angle of elevation at which the scene contrast is no longer detectable by the pilot's eye and above which the land detail or runway workings cannot be seen by virtue of the visual range in the simulated fog, will be reduced. To control the intensity of the source 13 compensation for ambient light conditions is provided. This consists of a photometric device including a photosensitive element coupled with suitable optics and is arranged to sense the sky brightness. A servo loop detects the difference between the output of this photometric device and a similar device which is positioned to sense the brightness of the screen 14 and alters the intensity of the source 13 until the ratio of the sky brightness to screen brightness is at a predetermined value. The value of this ratio determines the cut-off point.

In natural fogs the cut-off angle varies with the height of an aircraft in various different ways. The particular function appropriate to the type of fog which it is desired to simulate is stored, for example in the form of an electrical analogue circuit or by means of punched or magnetic tape, and is used to vary the said predetermined value of the ratio in accordance with the aircraft height in the desired manner. The aircraft height is sensed by means of either a barometric or a radio altimeter on board the aircraft, or both. The corresponding cut-off angle is then found from the store. The pitch attitude of the aircraft is fed from vertical gyro pick-off or an inertial platform output available within the aircraft, and this is added to the required cut-off angle and the sum is used at the input of the lamp intensity servo in order to achieve the correct cut-off angle regardless of the pitch of the aircraft.

Thus the simulated fog is stabilized and appears to remain stationary with respect to the ground as the aircraft moves on its pitch axis.

The natural laws governing the reflection and transmission through plates of dielectrics are different for each plane of polarization, therefore to enable the correct simulation to be achieved the plane of polarization should be correctly chosen. There is, therefore, provided some means of polarizing the direct light coming from the target or scene or some polarization is effected on the reflected luminance component. As illustrated, a polarizing screen 21 is included between the plates 10 and the pilot's eye 11. The diffusing surface of the screen 14 and the angle of the screen are chosen, together with an appropriate polarizing screen 21, to achieve the function of contrast degradation with angle that best matches that which occurs in natural fogs. The surface of the diffusing plate 14 may be made into a honeycomb, embossed or patterned structure to achieve the desired luminance function with angle.

Various other modifications may be made to the fog simulator of FIG. 1, and some of these will now be mentioned.

The source 13 and diffuser plate 14 can be removed and in this case the sky may be used as the diffuse source of illumination. Again the overlay luminance can be varied by the inclusion of neutral filters or crossed polaroids, for example.

The angle of tilt of the stack of plates can be varied to vary the effective denseness of the simulated fog. The thickest useful arrangement will normally be when light from the horizon strikes the plates 10 at grazing incidence.

The plates 10 may have different refractive indices, or dielectric constants, and one plate alone may be mounted for tilting independently of the others.

The plates 10 may be made of materials other than glass, such as laminated plastics film or sheets of plastics materials, and may be spaced by materials other than air such as sheets of different refractive index. One plate alone, however, may be sufficient in certain circumstances.

The plates 10 may be mounted so as to rotate with respect to the aircraft so as to compensate for variations in the attitude of the aircraft.

The simulator may be employed in other situations to provide a controllable degradation of a visual scene. Some examples of such use will now be given.

The device may be placed in front of a television or photographic camera to give the appearance of fog in the resultant picture.

The device may be used to test the vision of a human eye. The device is positioned between the eye to be tested and a test card and the angle of tilt or the number of plates is altered until the observer can just see the test card. The angle of tilt or the number of plates used then gives an indication of the ability of the eye to detect contrast.

The device may be used in a similar manner to test for example the performance of a television or photographic system, or to test an infra-red detector.

The device may also be used to test luminance distributions such as panel lighting and other displays to ensure that the lights are all of similar brilliance. The device may also be used to measure the denseness of natural fog.

I claim:

1. In an aircraft or a flight simulator having a pilot's position and a windscreen, a fog simulator comprising:
   a diffuse source of illumination above said pilot's position;
   a plurality of spaced parallel transparent sheets of substantially equal area positioned between said pilot'position and said windscreen;
   said sheets being arranged in close proximity to one another so that each succeeding sheet between the portion of the preceding sheet;
   said sheets being positioned below said source of illumination so as to receive light from said source and multiply reflect same between said sheets and direct at least a substantial portion of reflected light towards said pilot's position with the major portion of the light transmitted from the first sheet to the succeeding sheets being received by the first sheet from said source of illumination;
   said sheets being positioned at an acute angle with respect to the mean line of sight between the pilot's position and the windscreen while being maintained in spaced parallel relation to one another;
   said sheets having the upper portion thereof further from said pilot's position than the lower portion to reflect from said upper portion a greater proportion of light from said source towards said pilot's position to produce the effect of increasing degradation of increasing distance as viewed through said sheets.

2. Apparatus according to claim 1 comprising a polarizing sheet positioned between the transparent sheets and the pilot's position.

3. Apparatus as claimed in claim 1, wherein said transparent sheets are mounted for rotation about a horizontal axis, and including adjustable means coupled to said sheets to vary the angle of said sheets to alter the proportion of light from said diffuse source directed towards said pilot's position.

4. Apparatus as claimed in claim 1, wherein said source provides substantially uniform illumination over the surface thereof.

5. Apparatus as claimed in claim 1 mounted in an aircraft, wherein said sheets are rotatably mounted about a horizontal axis, and including means connected to rotate said sheets about said axis to compensate for variations in the attitude of said aircraft.

6. Apparatus as claimed in claim 1, wherein said diffuse source comprises at least one lamp arranged behind a diffuser plate.

7. Apparatus as claimed in claim 6, wherein the brightness of said lamp is variable.

8. Apparatus according to claim 6 means adapted to measure ambient light, and means coupled between said measuring means and said lamp to maintain a predetermined ratio between the ambient light and the brightness of said source.

9. Apparatus according to claim 8 mounted in an aircraft, including means for varying said ratio in dependence upon the height of said aircraft.

10. Apparatus according to claim 6 mounted in an aircraft, including means connected to vary the brightness of said lamp in dependence upon the pitch of said aircraft.

11. Apparatus for controllably degrading a visual scene as seen by a light receptor, said apparatus comprising;
    a diffuse source of illumination;
    a stack of spaced parallel transparent sheets of substantially equal area positioned between said scene and said receptor;
    said sheets being arranged in close proximity to one another so that each succeeding sheet between said receptor and said scene underlies a substantial portion of the preceding sheet;
    said sheets being positioned adjacent said source of illumination so as to receive light from said source and multiply reflect same between said sheets and direct at least a substantial portion of reflected light toward said light receptor with the major portion of the light transmitted from the first sheet to the succeeding sheets being received by the first sheet from said source of illumination;
    said sheets being angled with respect to a mean path of light from said scene to said receptor through said stack;
    the angle of said sheets being such as to degrade the quality of said visual scene as seen by said receptor; and
    adjustable means rotatably mounting said sheets to provide for variation of the amount of said degradation.

12. Apparatus as claimed in claim 11, wherein the power of said source is variable.

* * * * *